Aug. 13, 1957   G. SLAYTER ET AL   2,802,764
ACOUSTICAL MATERIAL
Filed Oct. 8, 1952
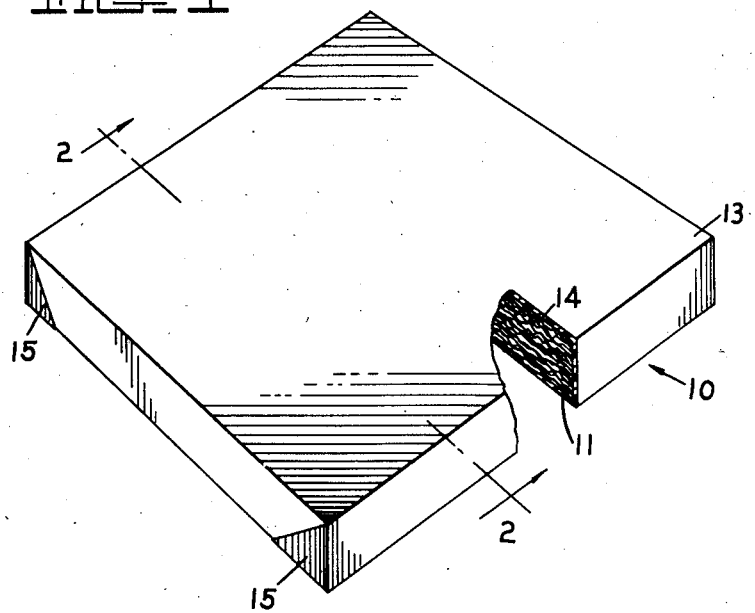
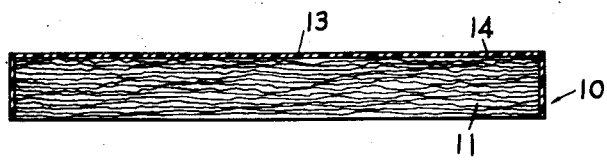
INVENTOR.
GAMES SLAYTER
ROBERT B. TAYLOR
BY
ATTORNEYS United States Patent Office 2,802,764
Patented Aug. 13, 1957

2,802,764
ACOUSTICAL MATERIAL

Games Slayter, Newark, Ohio, and Robert B. Taylor, Downers Grove, Ill., assignors to Owens-Corning Fiberglas Corporation, Toledo, Ohio, a corporation of Delaware Application October 8, 1952, Serial No. 313,676

6 Claims. (Cl. 154—44)

This invention relates generally to an improved acoustical material, and also to a method of manufacturing the material. More particularly, the invention concerns itself with an acoustical material adapted for use as a covering for walls and/or ceilings.

The present application is in part a continuation of our application Serial No. 72,872, filed on January 26, 1949, now abandoned.

A sound absorbing material extensively used is a mat composed of fibers, for instance, glass fibers, bonded together by a binder in compact relation. The product is a rigid mat or board which may vary in size from a small tile to a panel of substantial size, and the fibrous material is sufficiently porous to permit entry of sound waves into the interior of the fibrous body where the sound energy is absorbed. The porous surface made washing and other cleansing unsatisfactory and resurfacing of the exposed face of the material by painting closed the mouths of the pores in the material. To offset this it has been the practice to provide in the exposed surface of the material a large number of holes of about ¼" in diameter. This so-called "perforated tile" is objected to because the perforations detract from the appearance of the covering. They also enable broken or loose fibers to sift out of the perforations onto the floor of the room.

One of the objects of this invention is to improve the sound reduction qualities of fibrous sound absorbing material.

It is another object of the invention to provide an acoustic tile presenting a smooth pleasing appearance and free from the danger of broken or loose fibers dropping onto the floor of the room.

It is still another object to provide such a tile that may be readily washed or otherwise cleaned as desired without interfering with the sound reducing characteristics and without detracting from the original appearance of the material.

According to the invention the exposed surface of the material is covered with a film or membrane possessing sufficient flexibility to vibrate under the influence of sound waves. The thin flexible film or membrane is stretched tightly over the exposed face of the sound absorbing material, and is free to move relative to the sound absorbing material under the influence of sound waves. The sound waves are transmitted to the fibrous material and are absorbed by the latter to such an extent that the noise producing energy is substantially reduced. The film or membrane is preferably imperforate.

Still another feature of this invention is to provide a film or membrane of a thermoplastic material characterized in that it may be firmly secured to the marginal edge portions of the mat of sound absorbing material by the application of heat and pressure.

A further object of this invention is to provide a film or membrane which will shrink in response to the application of heat at the temperature required to seal the same to the fibrous mat. Thus the membrane is shrunk on the mat at the time it is heat sealed to the edges of the latter, and production of the product is greatly simplified.

The foregoing, as well as other objects, will be made more apparent as this description proceeds, especially when considered in connection with the accompanying drawing, wherein:

Figure 1 is a perspective view of sound absorbing material embodying the features of this invention;

Figure 2 is an exaggerated sectional view taken on the line 2—2 of Figure 1; and Figure 3 is a sectional view showing a modified form of construction.

The sound absorbing material forming the subject matter of this invention is shown herein for the purpose of illustration in the form of a tile particularly suited for application on a ceiling of a room. It is to be understood, however, that the material may also be in the form of sheets or panels of practically any desired size or thickness for use on walls and/or ceilings. In any case the material comprises a mat composed of fibers bonded together by a suitable binder and compacted to provide a rigid board-like structure of the desired density. The density of the mat may vary from 6 to 10½ or more pounds per cubic foot, and in any event, the mat possesses the porosity required to absorb sound. The fibers may be of practically any material capable of being fabricated to form a rigid porous mat, but glass fibers are preferred, because they lend themselves more readily to the manufacture of a mat having the desired rigidity, and at the same time having the characteristics required to encourage penetration of sound energy.

The mat may be produced in accordance with any one of a number of known processes, and this description need not be complicated by a detailed description of any particular process. Briefly one process which has been found satisfactory from an economical point of view is to feed glass into a blast of gas having a temperature above the softening point of glass and having a velocity sufficiently high to attenuate softened glass into fine fibers. The fibers are propelled by the force of the blast toward a traveling conveyor or screen, and are collected on the latter in the form of a mat. As the fibers build up in the form of a mat on the conveyor, a binder such as, for example, as phenol formaldehyde, is sprayed or otherwise applied to the fibers. The mass of fibers is compacted by passing the same between rollers, for example, and the binder is heat treated at the temperature required to cause the same to polymerize into a final set. The heat treating operation is effected while the mass of fibers is held in the desired compacted condition in order to provide a mat of the proper rigidity and density.

A fibrous mat produced in accordance with the above or some similar process has the porosity required to effectively absorb sound waves, and possesses excellent noise reduction characteristics. In order to improve the appearance of an installation embodying fibrous acoustical material of the above general type, it has been proposed to cover the exposed surface of the material with a coat of paint sufficiently porous to enable obtaining the desired decorative effects without appreciably detracting from the sound absorbing characteristics of the material. However, in order to maintain the desired decorative appearance, it has been customary to periodically repaint the material. Repeated application of paint, regardless of the porosity of the latter has the tendency to reduce the permeability of the material to sound waves, and in order to overcome this objection, it has also been the practice to drill, punch or otherwise form a multiplicity of perforations in the exposed surface of the material. The perforations are usually of sufficient diameter and depth that they provide a means of entry for sound energy into the acoustical material even though the latter has been repeatedly repainted. Unfortunately, the perforations are not always desirable from an appearance point of view, and in any case, increase the cost of manufacture as well as permit broken or loose fibers to sift out of the material.

The present invention renders it possible to take full advantage of the excellent sound absorbing qualities of bonded glass fiber boards or material, and at the same time, eliminates many of the objections thereto. As shown in the drawing, the numeral 10 designates generally an acoustical board or tile comprising a body 11 and a covering 13 for the exposed face 14 of the body 11. The body 11 is preferably in the form of a rigid mat of bonded glass fibers of suitable thickness and density. In fact the fibrous mat or body 11 may be identical to the one previously described, except that it is imperforate and the exposed surface is not painted. The pores resulting from the fabrication of the mat provide ample means of entry for sound energy into the mat, and this energy is substantially dissipated within the body of the mat.

The desired decorative or finished appearance is imparted to the mat by the covering 13 which is in the form of a film or membrane, and is preferably very thin, being about 1 or 2 mils thick. In any case the film or membrane 13 is sufficiently thin and flexible to vibrate under the influence of sound waves. Since the film or diaphragm occupies a position immediately adjacent the face of the mat 11, the sound waves or energy not dissipated in the process of moving the membrane are transmitted to the mat and absorbed to a great extent within the latter.

The above results are obtained by stretching the film or membrane tightly across the exposed face of the mat 11 and by avoiding direct attachment of the film or membrane to the face 14 of the mat. Thus, the film or membrane 13 is vibrated relative to the mat 11, and some of the sound energy is dissipated by the moving film or membrane. As a result, the film or membrane actually assists the mat of sound absorbing material in dissipating the noise.

The flexible film or membrane 13 may be in sheet form and is preferably firesafe as well as resistant to moisture and light. Also, the material proposed presents a smooth surface which may be readily washed or otherwise cleaned, and in addition, should be inexpensive. Especially satisfactory results have been obtained by employing an oriented form of vinylidene chloride film sold under the trade name "Saran," a thermoplastic material characterized in that it will shrink to a considerable extent when subjected to heat of relatively low temperatures of from 175° to 225° F. Such desired results, it has been found, are also producible with a polyester resin sold under the trade name "Mylar" which is a film made from the polymer formed by the condensation reaction between terephthalic acid and ethylene glycol.

It is to be noted that 'Saran" and "Mylar" are each available in two forms, one in which the material has been conditioned to establish a semblance of molecular orientation such as by having been worked by stretching or extrusion, and a second form in which such conditioning has not been effected. The first or conditioned form of each is the material having the desired shrink characteristics which permits application of the film in accordance with the present invention. Both "Saran" and "Mylar" are firesafe; washable; resilient; durable; resistant to alcohols, oils, and greases; and have good strength characteristics wet or dry.

In manufacture, a prefabricated film of the above resinous material with marginally applied adhesive is fitted snugly over the surface 14 of the mat 11, and the marginal edges 15 of the sheet are folded over the edges of the mat 11 in the manner shown in Figure 1 of the drawing. A pressure may be applied to firmly hold the folded edges 15 of the sheet to the edges of the mat 11 in the presence of the heat to soften the edge portions 15 and effect a better adherence of the same to the mat 11. The heat applied is in the neighborhood of 200° F., and is sufficient to shrink the sheet the amount required to tightly stretch it over the face 14 of the mat. Thus, the sheet is held under sufficient tension to hold it taut, thereby, placing the mat or slab under compression, but the rigidity of the slab is such as to resist the compressive forces thereon without deformation. The shrinking action applies substantial compressive forces on the edges of the mat 11, and in some instances it may be desirable to reinforce the corners of the mat by spraying or otherwise applying a stiffening agent or resin to the mat at the corners thereof. There are numerous resins that may be used for the above purpose and one example of a suitable resin is methyl methacrylate.

It is also possible to obtain satisfactory results by the arrangement shown in Figure 3 of the drawing, wherein the film 17 has the marginal edge portions 18 folded over the reverse side of the mat 11 and secured thereto. In this instance the marginal edges 18 of the film 17 of "Saran" or "Mylar" are secured directly to the exposed face of the fibrous board or mat 11 by a suitable adhesive, such for example, as organosol or a dispersion of latex. The adhesive may be sprayed or otherwise applied to both the film and mat before positioning the film on the mat or board. After the film is properly positioned on the board or mat of sound absorbing material, the adhesive is allowed to dry, whereupon the product is ready for heat shrinkage to effect the desired smooth and taut condition. It is preferred to have the central portions of the film unsupported, so that it will vibrate under the influence of sound waves and thereby dissipate some of the sound energy.

It follows from the above that an acoustical material is provided comprising a fibrous mat or board and a film or membrane on the exposed face of the board. The fibrous mat or board may be sufficiently rigid to enable its use as a wall or ceiling covering, and is fabricated to possess excellent sound absorbing characteristics. The film or membrane is of a nature to not only assist the noise reduction qualities of the mat or board, but in addition, provides a smooth surface of pleasing appearance which may be repeatedly washed or cleaned without detracting from the noise reduction characteristics of the material.

As a modification falling within the teachings of this invention, a sound-absorbing baffle unit or baffle tile is made in which the core of fibrous board or mat is completely enclosed in one or more sheets of thermoplastic material and wrapped thereabout to provide a single film layer on each side. The film is preferably free to vibrate throughout the greater area of each side of the unit and held only at the edges of the core. The film is simply wrapped over the major surfaces of the core, folded and adhesively secured to the core edges in a manner similar to that shown in Figures 2 and 3 and then heat shrunk to provide a taut film over the major surfaces to improve the efficiency as well as the appearance of the unit.

Such a unit when suspended from a ceiling acts as a sound baffle device which effectively absorbs sound on more than one side and can be arranged in series with a series of similar units to reduce the general noise level in noisy areas such as are frequently encountered in industrial or commercial buildings. Any of a number of means may be used to suspend the unit from a ceiling, for example, the unit can be held by wires fastened to metal bands encircling the unit, or textile ribbon members might be secured to the unit and provided with a length to enable fastening to convenient support members.

We claim:

1. Acoustical tile comprising a slab composed of compacted glass fibers bonded together into a rigid body, and a thin flexible impervious resinous membrane extending over a major surface of said mat, said membrane being of a resinous material which will shrink when subjected to heat, said membrane also being secured to the body at its edges and shrunk to a taut condition over said surface.

2. As an article of manufacture, a lightweight acoustical treatment for walls and ceilings comprising a rectangular slab of mineral fibers interbonded into a form-retaining body by a rigid non-deformable binder distributed through the slab, a fire safe covering of originally heat-shrinkable synthetic resin impervious sheet material over a face of said slab, the covering being of such thinness that it is vibratable by normally encountered sound waves and being fastened directly to the fibrous slab itself against lateral movement of said covering relative to said slab at portions other than said face, said covering being shrunk in place on said slab to an extent putting the covering under sufficient tension to hold it taut over the surface of the slab and putting the slab under compression along the surface covered, said slab being of itself sufficiently rigid to resist the compression thereon without deforming, the slab and covering forming a self-contained unit that can be applied in the form of tile to ceilings and walls.

3. As an article of manufacture, a lightweight acoustical treatment for walls and ceilings consisting of a rectangular slab of mineral fibers interbonded into a porous form-retaining body, a fire-safe covering of originally heat-shrinkable impervious sheet material extending continuously over a face of said slab, the covering being of such thinness that it is vibratable by normally encountered sound waves and being fastened directly to the edge surfaces of the fibrous slab itself by means preventing lateral movement of said covering relative to said slab, said covering being shrunk in place on said slab to put the covering under sufficient tension to hold it taut against said edges and over the surface of the slab, said slab being sufficiently rigid to resist the contraction of said covering when shrunk, the slab and covering forming a self-contained unit that can be applied in the form of tile to ceiling and wall surfaces.

4. An acoustical unit consisting of compacted glass fibers bonded together into a rigid rectangular body, a fire-safe heat shrinkable resinous surfacing material extending over each of the major surfaces of said body in the form of a membrane over each such surface, each said membrane being fastened to the edges of said body and being shrunk to a taut condition established by reason of tension in said membrane being exerted against said edges and over its respective surface.

5. As an article of manufacture, a lightweight acoustical treatment for walls and ceilings comprising a slab of glass fibers interbonded into a form-retaining body by a thermally-set resinous binder distributed through the slab, a fire-safe covering of originally heat-shrinkable impervious resinous film over a face of said slab selected from the group consisting of polyethylene terephthalate, vinyl chloride, vinylidene chloride and copolymers of vinyl chloride and vinylidene chloride, the covering being of such thinness that it is vibratable by normally encountered sound waves and being cemented directly to the edge surfaces of the fibrous slab itself against lateral movement of said covering relative to said slab, said covering being shrunk in place on said slab to an extent putting the covering under sufficient tension to hold it taut over the surface of the slab and prevent sagging, said slab being placed under compression along the surface covered by the shrinking of the covering and of itself being sufficiently rigid to resist the compression without deforming, the slab and covering forming a self-contained unit that can be applied in the form of tile to ceilings and walls.

6. As an article of manufacture, a lightweight acoustical treatment for walls and ceilings comprising a slab of glass fibers interbonded into a form-retaining body by a thermally-set resinous binder distributed through the slab, a fire-safe covering of originally heat-shrinkable impervious resinous film over a face of said slab selected from the group consisting of polyethylene terephthalate, vinyl chloride, vinylidene chloride and copolymers of vinyl chloride and vinylidene chloride, the covering being of such thinness that it is vibratable by normally encountered sound waves and being cemented directly to the surfaces of the four edges of the fibrous slab so that the covering is snubbed over the edges surrounding the covered face and held against lateral movement relative to said slab, said covering being shrunk in place on said slab to an extent putting the covering under sufficient tension to hold it taut over the surface of the slab and prevent sagging, said slab being placed under compression along the surface covered by the shrinking of the covering and of itself being sufficiently rigid to resist the compression without deforming, the slab and covering forming a self-contained unit that can be applied in the form of tile to ceilings and walls.

References Cited in the file of this patent

UNITED STATES PATENTS

| | | |
|---|---|---|
| 2,029,441 | Parkinson | Feb. 4, 1936 |
| 2,031,900 | Miller | Feb. 25, 1936 |
| 2,045,312 | Ross et al. | June 23, 1936 |
| 2,477,611 | Irons | Aug. 2, 1949 |
| 2,514,685 | Virtue | July 11, 1950 |